United States Patent
Patchirajan et al.

(10) Patent No.: US 11,163,937 B1
(45) Date of Patent: Nov. 2, 2021

(54) REDUCING NONVISUAL NOISE BYTE CODES IN MACHINE READABLE FORMAT DOCUMENTS

(71) Applicant: Intuit Inc., Mountain View, CA (US)

(72) Inventors: Karpaga Ganesh Patchirajan, Plano, TX (US); Connor Lawson Mcdonald, Plano, TX (US); Harsha Ilapakurthy, Plano, TX (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/922,082

(22) Filed: Jul. 7, 2020

(51) Int. Cl.
 *G06F 40/149* (2020.01)
 *G06F 16/93* (2019.01)
 *G06K 9/18* (2006.01)
 *H04N 1/32* (2006.01)

(52) U.S. Cl.
 CPC ............ *G06F 40/149* (2020.01); *G06F 16/93* (2019.01); *G06K 9/18* (2013.01); *G06T 2201/0062* (2013.01); *G06T 2201/0203* (2013.01); *H04N 1/32149* (2013.01); *H04N 1/32347* (2013.01); *H04N 1/32352* (2013.01)

(58) Field of Classification Search
 CPC ... G06F 40/149; G06F 16/93; H04N 1/32352; H04N 1/32149; H04N 1/32347; G06T 2201/0203; G06T 2201/0062; G06K 9/18
 See application file for complete search history.

(56) References Cited

U.S. PATENT DOCUMENTS

2011/0196879 A1* 8/2011 Robinson ................ G06F 16/93
 707/749

* cited by examiner

*Primary Examiner* — Christopher Wait

(74) *Attorney, Agent, or Firm* — Ferguson Braswell Fraser Kubasta PC

(57) ABSTRACT

A method may include obtaining a first byte stream from first document code and a second byte stream from second document code. The first document code has a document type and the second document code has the document type. The method may further include identifying, in the first byte stream, nonvisual noise corresponding to a custom byte code defined in a custom character encoding set. The nonvisual noise is invisible when rendering the first document code. The method may further include replacing, in the first byte stream, the custom byte code with at least one standard byte code defined in a standard character encoding set to obtain modified document code. The second document code uses the standard character encoding set. The method may further include comparing the modified document code with the second document code by comparing the first byte stream with the second byte stream.

20 Claims, 10 Drawing Sheets

REDUCING NONVISUAL NOISE BYTE CODES IN MACHINE READABLE FORMAT DOCUMENTS

BACKGROUND

Comparing versions of a document represented in a machine-readable format to identify changes can be challenging due to noise present in the documents. Noise may be defined as information that is irrelevant to the content of the document. Examples of noise in documents include watermarks, annotations, font encodings, etc. Some documents (e.g., tax forms) change periodically, and identifying changes between versions of the documents is important for programmatic processing of such documents. Because noise is irrelevant to the content, noise in the documents may result in false changes being identified, potentially obfuscating important differences in content and thus complicating the comparison of the documents. When content analysis is performed on a large volume of electronic documents, an effective method of programmatically removing noise is desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining a first byte stream from first document code and a second byte stream from second document code. The first document code has a document type and the second document code has the document type. The method further includes identifying, in the first byte stream, nonvisual noise corresponding to a custom byte code defined in a custom character encoding set. The nonvisual noise is invisible when rendering the first document code. The method further includes replacing, in the first byte stream, the custom byte code with at least one standard byte code defined in a standard character encoding set to obtain modified document code. The second document code uses the standard character encoding set. The method further includes comparing the modified document code with the second document code by comparing the first byte stream with the second byte stream.

In general, in one aspect, one or more embodiments relate to a system including a computer processor and a repository configured to store first document code having a document type. The first document code includes a first byte stream. The repository is further configured to store second document code having the document type. The second document code includes a second byte stream. The repository is further configured to store a custom character encoding set and a standard character encoding set. The system further includes a noise remover executing on the computer processor and configured to identify, in the first byte stream, nonvisual noise corresponding to a custom byte code defined in the custom character encoding set. The nonvisual noise is invisible when rendering the first document code. The noise remover is further configured to replace, in the first byte stream, the custom byte code with at least one standard byte code defined in the standard character encoding set to obtain modified document code. The second document code uses the standard character encoding set. The noise remover is further configured to compare the modified document code with the second document code by comparing the first byte stream with the second byte stream.

In general, in one aspect, one or more embodiments relate to a non-transitory computer readable medium including instructions that, when executed by a computer processor, perform obtaining a first byte stream from first document code and a second byte stream from second document code. The first document code has a document type and the second document code has the document type. The instructions further perform identifying, in the first byte stream, nonvisual noise corresponding to a custom byte code defined in a custom character encoding set. The nonvisual noise is invisible when rendering the first document code. The instructions further perform replacing, in the first byte stream, the custom byte code with at least one standard byte code defined in a standard character encoding set to obtain modified document code. The second document code uses the standard character encoding set. The instructions further perform comparing the modified document code with the second document code by comparing the first byte stream with the second byte stream.

Other aspects of the invention will be apparent from the following description and the appended claims.

DETAILED DESCRIPTION

Figure 1A:
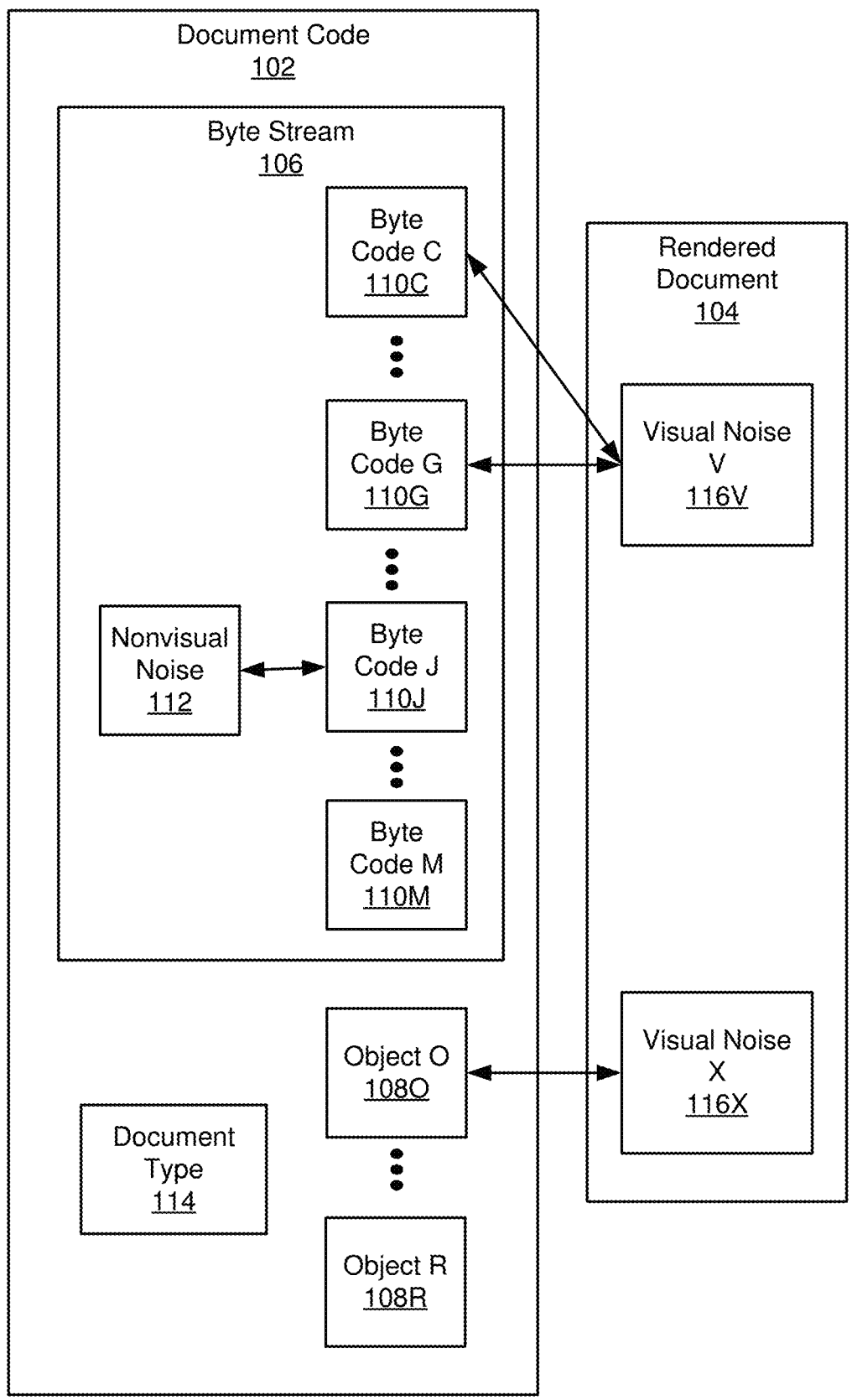
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Identifying changes in periodically changing versions of a document (e.g., a tax form) represented in a machine-readable format may be cumbersome due to noise caused by differences in how the document contents are represented, potentially resulting in false content differences being identified. The noise may be visual, such as watermarks and annotations, or the noise may be nonvisual, such as different font encodings and different byte stream representations of the same content.

Including differences in noise when comparing documents may obfuscate important differences in content. For example, if there are no differences in content, the comparison may falsely indicate a difference that is pure noise. One or more embodiments provide a mechanism for a computer to operate on a byte stream representation of a document to remove noise. Thus, for example, comparison results do not obfuscate differences in content.

The disclosed invention provides a new document pre-processing capability that streamlines content analysis of machine-readable documents by identifying and removing visual and nonvisual noise from byte stream representations of documents. For example, nonvisual noise due to custom byte codes may be identified and then removed by replacing the custom byte codes with equivalent standard byte codes that encode the same characters encoded by the custom byte codes. As another example, documents represented using multiple byte streams may be converted into equivalent single byte stream representations, further facilitating a reduced-noise content comparison of the documents.

FIG. 1A shows document code (102) and a rendered document (104) in accordance with one or more embodiments. The document code (102) and the rendered document (104) are different representations of a same document. A document is any type of written matter that captures information. For example, a document may be a form, a spreadsheet, a presentation, a word processing application document, or other such document. By way of an example, the document may be a compliance form (e.g., audit form, data security form, tax form, medical form, privacy policy, etc.) to be completed by a user, and designed to comply with the regulations of a government agency. For example, the compliance form may be specific to a jurisdiction (e.g., a geographic region such as a state, country, region, municipality, reinvestment zone, etc.).

The document code (102) is a representation of a document in a specific format. For example, the format may be the Portable Document Format (PDF), HyperText Markup Language (HTML), eXtensible Markup Language (XML), JavaScript Object Notation (JSON), or any other format. The document code (102) may be interpreted and/or rendered by a software application corresponding to the specific format. The document code (102) may be the output generated by a software tool that converts document code represented in one format (e.g., word processing application format) to document code represented in another format (e.g., PDF).

As shown in FIG. 1A, the document code (102) includes a byte stream (106), objects (108O, 108R), and a document type (114). The byte stream (106) includes a sequence of byte codes (e.g., 110C, 110G, 110J, 110M). Each byte code (110C) encodes one or more characters in a character encoding set (e.g., character encoding set (130E) of FIG. 1B).

In one or more embodiments, the document code (102) includes multiple byte streams. The multiple byte streams may correspond to multiple streams of content. For example, a primary byte stream may include one or more references to one or more secondary byte streams. Continuing this example, the one or more secondary byte streams may correspond to one or more instances of a repeating template. Further continuing this example, the template may be a chunk of content, such as a fillable row including a name and Social Security number, where the fillable row is repeated (e.g., instantiated) several times to enable entry of the name and Social Security number of multiple individuals. The multiple byte streams may be separated by byte stream boundary markers (e.g., byte sequences) in the document code (102).

The objects (108O, 108R) represent components of the document. For example, a document component may be a chunk of text, a shape (e.g., a line or rectangle), an image (e.g., a bitmap), etc. In one or more embodiments, an object (108O) includes attributes that describe the corresponding document component. The attributes may be textual attributes such as font, font size, number of characters, number of words, and various flags, etc. For example, a Boolean flag may indicate the type of the object (108O), such as a text chunk (e.g., sentence, paragraph, etc.), watermark, annotation, etc. An object (108O) may include a reference to the portion of the byte stream (106) corresponding to the object (108O).

In one or more embodiments, the document type (114) is a category that describes the document. For example, the document type (114) may be a general category, such as tax document, payroll document, or legal document. Alternatively, the document type (114) may be a specific category, such as Schedule 1 of a Federal Tax Form, etc.

The rendered document (104) is a view of the document code (102) presented on an output device of a computing system (e.g., an output device (508) of computing system (500)) by a software application, such as a PDF viewer. Thus, the rendered document is the interpreted form of the document code as interpreted by a software application. Whereas the document code may be displayed in a plaintext form, the rendered document has the content shown in the visual formatting defined within the document code, such as tables, fonts, color, and other formatting. The rendered document (104) may include visual noise (e.g., visual noise (116V), visual noise (116X), etc.) that is visible when the rendered document (104) is presented. Noise is defined as information included in the document code (102) that is irrelevant when processing the content represented by (i.e., information presented within) the document code (102). For example, noise may be irrelevant when presenting or analyzing the content of the document represented by the document code (102). That is, the noise may affect the rendering and/or representation of the document code (102) without affecting the content of the document code (102). When comparing two versions of document code at the byte stream level, the software application that is used to interpret the byte streams is not used. Thus, it may be possible to compare document code represented using different formats (e.g., PDF and a word processing application format).

Visual noise (116X) may correspond to an object (108O) of the document code (102). For example, the object (108O) may be an annotation (e.g., highlighting or an arrow), a watermark, etc. The object (108O) may include an attribute indicating that the type of the object (108O) is "annotation", "watermark", etc. An object that includes an attribute indicating the type of the object is called a marked object. Conversely, an object that lacks an attribute indicating the type of the object is called an unmarked object. Alternatively or additionally, visual noise (116V) may correspond to one or more byte codes (110C, 110G) of the document code (102). For example, visual noise (116V) may correspond to one or more byte codes (110C, 110G) that represent an unmarked watermark.

In one or more embodiments, the document code (102) includes nonvisual noise (112) that is invisible when the rendered document (104) is presented. The nonvisual noise (112) may correspond to one or more byte codes (e.g., byte code (110J)) of the document code (102). For example, nonvisual noise (112) may be present when two versions of the document code (102) with the same document type (114) use different byte codes to encode the same character. Continuing this example, relative to the goal of comparing the content of different versions of the document code (102), whether the different versions use the same byte codes to encode the same character is irrelevant. As another example, nonvisual noise (112) may be present when one version of the document code (102) includes multiple byte streams and another version of the document code (102) includes a single byte stream, yet the contents of (e.g., the characters encoded by) the different versions are identical.

Figure 1B:
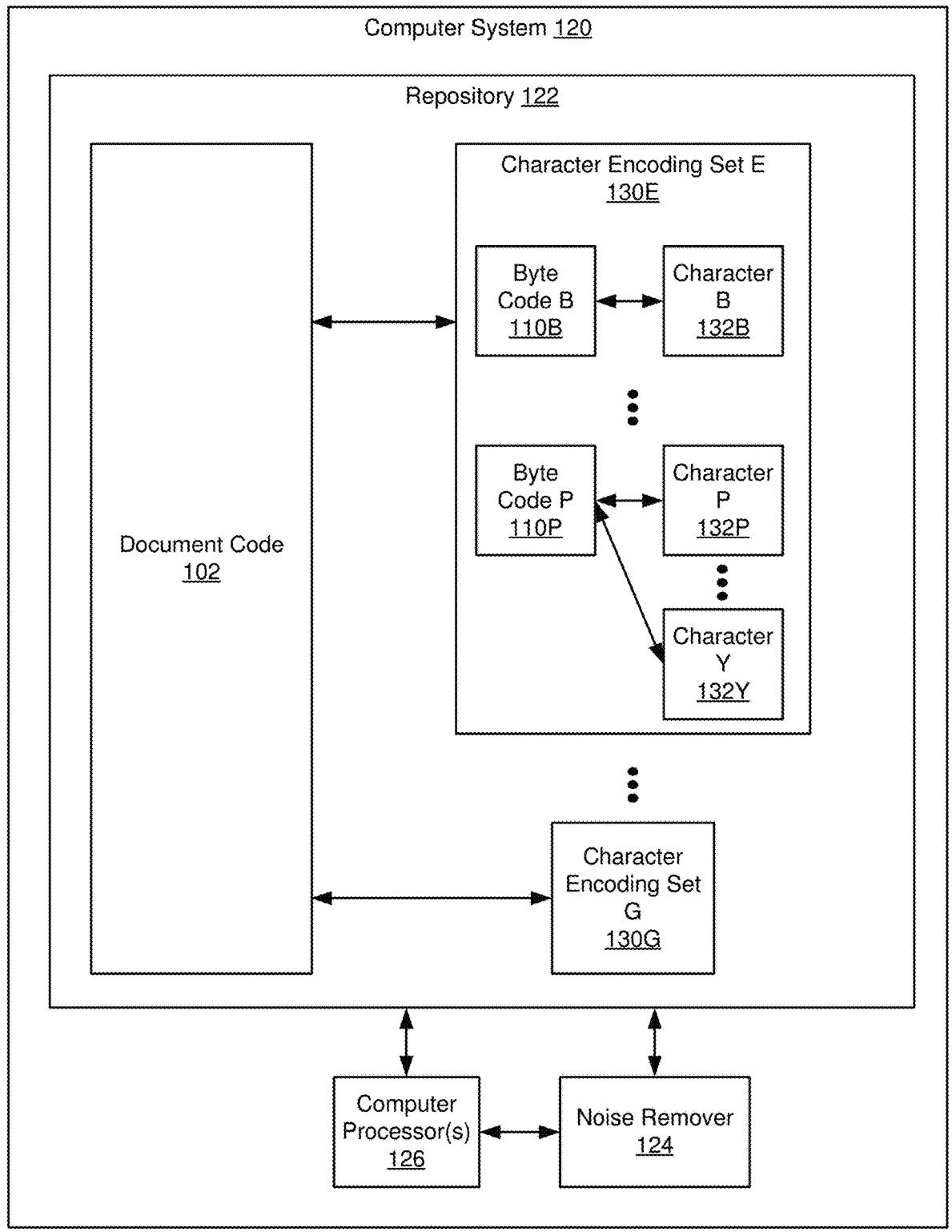

FIG. 1B shows a flow diagram of a computer system (120) in accordance with one or more embodiments. As shown in FIG. 1B, the computer system (120) includes a repository (122), a noise remover (124), and computer processor(s) (126). Each of these components is described below. The noise remover (124) includes functionality to identify noise in and/or remove noise from document code (102). The repository (122) is any type of storage unit and/or device (e.g., a file system, database, collection of tables, or any other storage mechanism) for storing data. Further, the repository (122) may include multiple different storage units and/or devices. The multiple different storage units and/or devices may or may not be of the same type or located at the same physical site. The repository (122) may be accessed online via a cloud service (e.g., Amazon Web Services, Egnyte, Azure, etc.).

The repository (122) includes functionality to store document code (102) and character encoding sets (130E, 130G). A character encoding set (130E) is a mapping from byte codes (110B, 110P) to characters (130B, 130Y). For example, a character encoding set (130E) may map a byte code (110B) to a single character (130B). Alternatively, the character encoding set (130E) may map a byte code (110P) to multiple characters (130P, 130Y).

A character encoding set (130E) may be a standard character encoding set. Examples of standard character encoding sets include: WinAnsiEncoding, Identity-H, etc. In a standard character encoding set, byte codes typically encode a single character. In other words, a standard character encoding set may map a byte code to a single character. For example, a standard character encoding set may map the byte code 56 to the character A. In contrast, custom character encoding sets often include byte codes that encode multiple characters. For example, a custom character encoding set may map the byte code X to the characters EZ. Continuing this example, a proprietary or special-purpose font may encode some characters using custom byte codes of a custom character encoding set while encoding other characters using standard byte codes of a standard character encoding set.

A custom character encoding set may modify a mapping used in a standard character encoding set. To continue the example above where a standard character encoding maps the byte code 56 to the character A, a custom character encoding set may instead map the byte code 56 to the character Z. Further continuing this example, the custom character encoding set may map a new byte code to the character A.

In one or more embodiments, the computer processor(s) (126) takes the form of the computer processor(s) (502) described with respect to FIG. 5A and the accompanying description below. In one or more embodiments, the computer processor(s) (126) includes functionality to execute the noise remover (124).

While FIG. 1A and FIG. 1B show a configuration of components, other configurations may be used without departing from the scope of the invention. For example, various components may be combined to create a single component. As another example, the functionality performed by a single component may be performed by two or more components.

Figure 2:
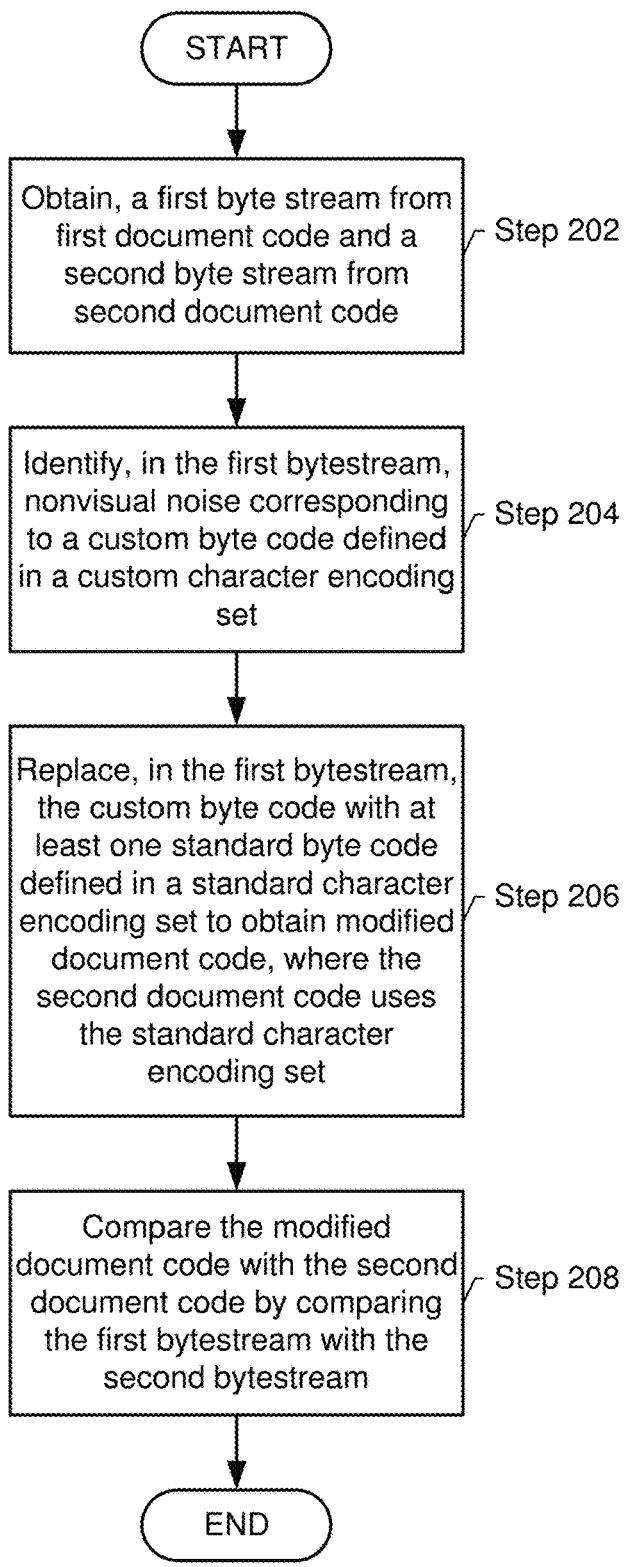
FIG. 2 and FIG. 3 show flowcharts in accordance with one or more embodiments of the invention.

FIG. 2 shows a flowchart in accordance with one or more embodiments of the invention. The flowchart depicts a process for reducing noise in document code. One or more of the steps in FIG. 2 may be performed by the components (e.g., the noise remover (124) of the computer system (120)), discussed above in reference to FIG. 1B. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a first byte stream is obtained from first document code and a second byte stream is obtained from second document code. Both the first document code and the second document code may have the same document type (e.g., a type of tax form, such as a 1040 form). For example, the second document code may be a next version of the first document code. The noise remover may obtain the first document code and the second document code from a repository. The noise remover may obtain the first byte stream from first document code and the second byte stream from second document code using a software tool. For example, the noise remover may use the open source library Apache PDFBox to read the contents of document code represented as a PDF file.

In Step 204, nonvisual noise is identified in the first byte stream. The nonvisual noise may correspond to a custom byte code defined in a custom character encoding set. The noise remover may obtain the custom character encoding set from the repository. The custom character encoding set may map the custom byte code to one or more characters. The noise remover may identify a byte code as a custom byte code in two situations.

Case 1: The byte code is mapped to a sequence of two or more characters (e.g., the sequence of characters "EZ").

Case 2: The byte code is mapped to a character D different from the character C specified by the mapping of the byte code in a standard character encoding set used in the document code (e.g., a standard character encoding set specified by a font in the document code). The noise remover may obtain the standard character encoding set from the repository. For example, if byte code B is mapped to character C in the standard character encoding set, and the custom character encoding set maps byte code B to character D, then the noise remover may identify byte code B as a custom byte code.

In Step 206, the custom byte code is replaced, in the first byte stream, with at least one standard byte code defined in a standard character encoding set to obtain modified document code. The second document code may use the standard character encoding set. For Case 1 above, the noise remover may replace each instance of the custom byte code in the first byte stream with the standard byte codes that map to the sequence of two or more characters. For example, see the description of FIG. 4D below. For Case 2 above, the noise remover may replace each instance of the custom byte code in the first byte stream with the standard byte code that maps to the character encoded by the custom byte code. Continuing the example in Step 204 above, if byte code Q is mapped to character D in the standard character encoding set, then the noise remover may replace the custom byte code B with the standard byte code Q (i.e., since both the custom byte code B and the standard byte code Q map to the character D). Thus, the modified document code may exclude nonvisual noise due to the presence of custom byte codes in the first byte stream of the first document code by replacing custom byte codes with equivalent standard byte codes.

In one or more embodiments, the noise remover replaces a custom byte code in the first byte stream after validating the replacement of the custom byte code. For example, if in Case 2 above a custom byte code is mapped to a special-purpose character that is undefined in (e.g., does not have a corresponding byte code in) the standard character encoding set, then the noise remover may decide not to replace the custom byte code in the first byte stream. Continuing this example, the noise remover may decide to replace a subset of the custom byte codes in the first byte stream whose replacement may be validated.

In one or more embodiments, the noise remover performs validation on one or more portions of the document code. For example, a portion of the document code may correspond to an object, such as a paragraph. Continuing this example, the noise remover may validate the replacement of a portion of the document code when each custom byte code replacement in the portion is validated. Alternatively, the noise remover may validate the replacement of a portion of the document code when the portion of the document code is successfully rendered (e.g., without generating an error).

In Step 208, the modified document code is compared with the second document code by comparing the first byte stream with the second byte stream. For example, a goal of the comparison may be to identify content differences between the first document code and the second document code. The comparison of the first byte stream with the second byte stream may avoid generating false positive content differences between the first document code and the second document code resulting from nonvisual noise due to the use of custom byte codes in the first document code. For example, using different byte codes (e.g., from different character encoding sets) to encode the same content is not a content difference in the context of a content comparison between different versions of document code.

In one or more embodiments, the comparison of the first byte stream with the second byte stream avoids generating false positive content differences between the first document code and the second document code resulting from nonvisual noise due to the use of multiple byte streams in the first document code, as described in Step 264 below. In addition, the comparison of the first byte stream with the second byte stream may avoid generating false positive content differences between the first document code and the second document code resulting from visual noise due in the first document code, as described in Step 252, Step 254, Step 256, and Step 258 below.

Figure 3:
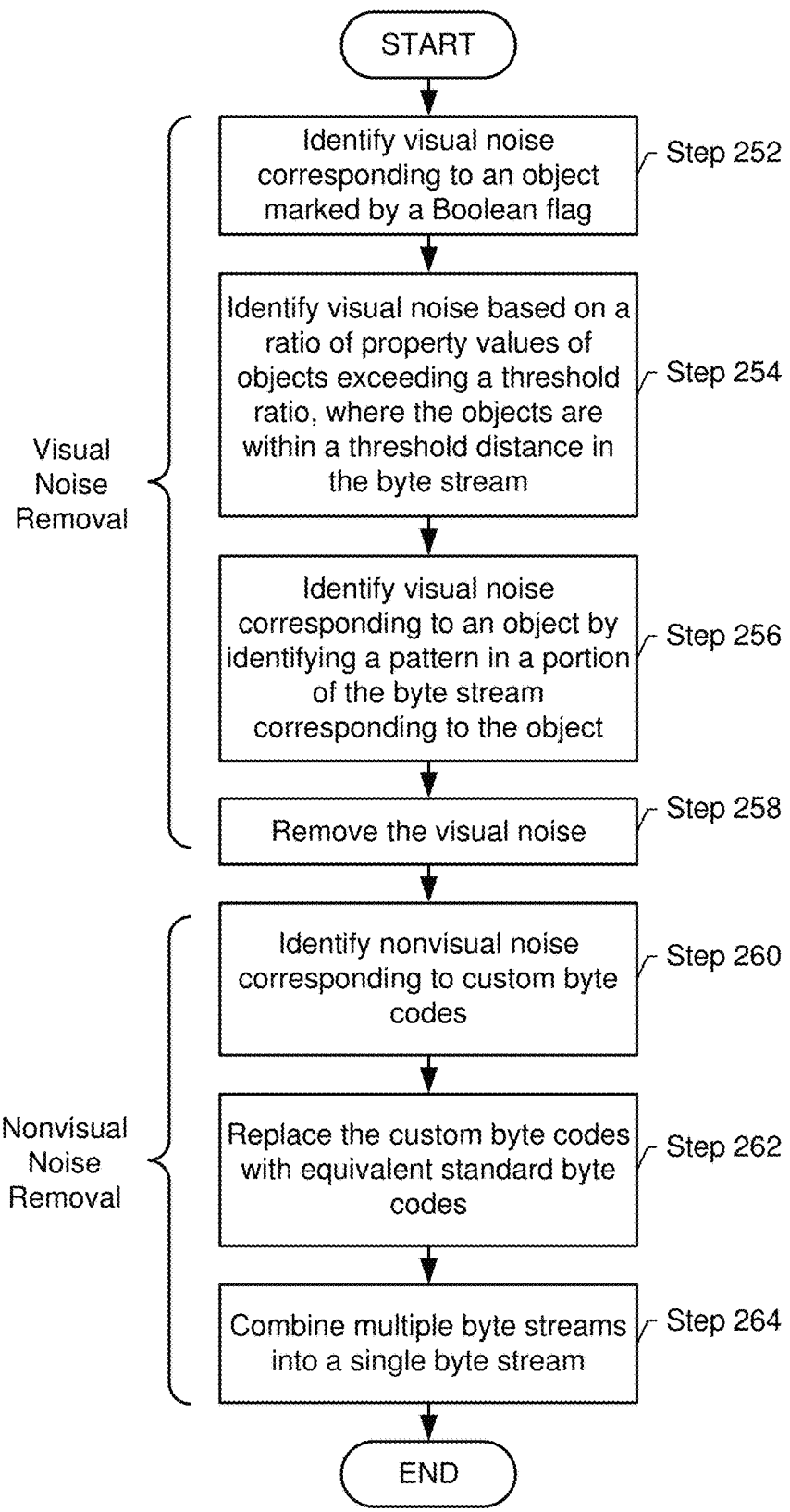

FIG. 3 shows a flowchart in accordance with one or more embodiments of the invention. The flowchart depicts a process for reducing noise in document code. One or more of the steps in FIG. 3 may be performed by the components (e.g., the noise remover (124) of the computer system (120)), discussed above in reference to FIG. 1B. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 252, visual noise corresponding to an object in the document code is identified. The noise remover may identify the object as visual noise based on a Boolean flag included in the object. For example, the Boolean flag may indicate that the type of the object is a watermark or annotation, and thus the object is irrelevant to a content analysis of the document code.

In Step 254, visual noise is identified based on a ratio of property values of objects in the document code exceeding a threshold ratio. The objects may be within a threshold distance (e.g., a threshold number of bytes) of each other in the byte stream of the document code. For example, the objects may correspond to adjacent byte sequences in the byte stream. Continuing this example, the property values may be font sizes and/or font orientations. Further continuing this example, when there is a significant change (e.g., as indicated by the ratio of the property values exceeding a threshold ratio) in the font sizes and/or font orientations of the objects, one of the objects may be a watermark. The noise remover may identify the watermark as visual noise relative to the purpose of analyzing the content of the document code. For example, the noise remover may identify (e.g., according to a rule) the object with the larger font size as the watermark. As another example, the noise remover may identify, as a watermark, a specific object whose font orientation is significantly different from the font orientation (e.g., as indicated by the ratio of the font orientations exceeding a threshold ratio) of one or more other objects in the byte stream that are within the threshold distance of the specific object.

In Step 256, visual noise corresponding to an object is identified by identifying a pattern of bytes in a portion of the first byte stream corresponding to the object. For example, the object may correspond to one or more tokens (e.g., a word or a phrase). The pattern of bytes may match a pattern known to correspond to visual noise, where the pattern is a sentence in a grammar. For example, the grammar may generate patterns of bytes known to correspond to (e.g., or are heuristically correlated with) unmarked watermarks. That is, there may be one or more objects in the document code that correspond to watermarks where the objects lack a Boolean flag indicating that the type of the object is "watermark". Alternatively, the pattern may be specified by a rule.

In Step 258, the visual noise is removed from the document code. For example, the noise remover may remove the portion of byte stream corresponding to the object identified as visual noise is Step 252, Step 254, and/or Step 256 above. In one or more embodiments, the noise remover first removes visual noise from the document code before removing nonvisual noise from the document code in Step 260, Step 262, and Step 264 below. For example, reducing the visual noise in the document code may reduce the size of the byte stream to be analyzed when identifying (e.g., searching for) nonvisual noise in the document code in Step 204 above.

In Step 260, nonvisual noise corresponding to custom byte codes is identified. Identifying nonvisual noise may be performed as discussed above with reference to Step 204.

In Step 262, the custom byte codes are replaced with equivalent standard byte codes. Replacing custom byte codes may be performed as discussed above with reference to Step 206.

In Step 264, multiple byte streams of the document code are combined into a single byte stream. For example, a primary byte stream may include one or more references to one or more secondary byte streams. The single byte stream is a "flattened" representation of the multiple byte streams without the one or more references to one or more secondary byte streams. By combining the multiple byte streams into a single byte stream, the noise remover avoids generating false positives when comparing different versions of the document code that represent equivalent content due to one version of the document code including multiple byte streams and the other version of the document code including a single byte stream. For example, false positives may be generated due to the presence of references between the multiple byte streams in one version of the document code, where the references between the multiple byte streams are absent from the single byte stream version of the document code. As another example, false positives may be generated due to the presence of byte stream boundary markers separating the multiple byte streams in one version of the document code, where the byte stream boundary markers are absent from the single byte stream version of the document code.

Figure 4A:
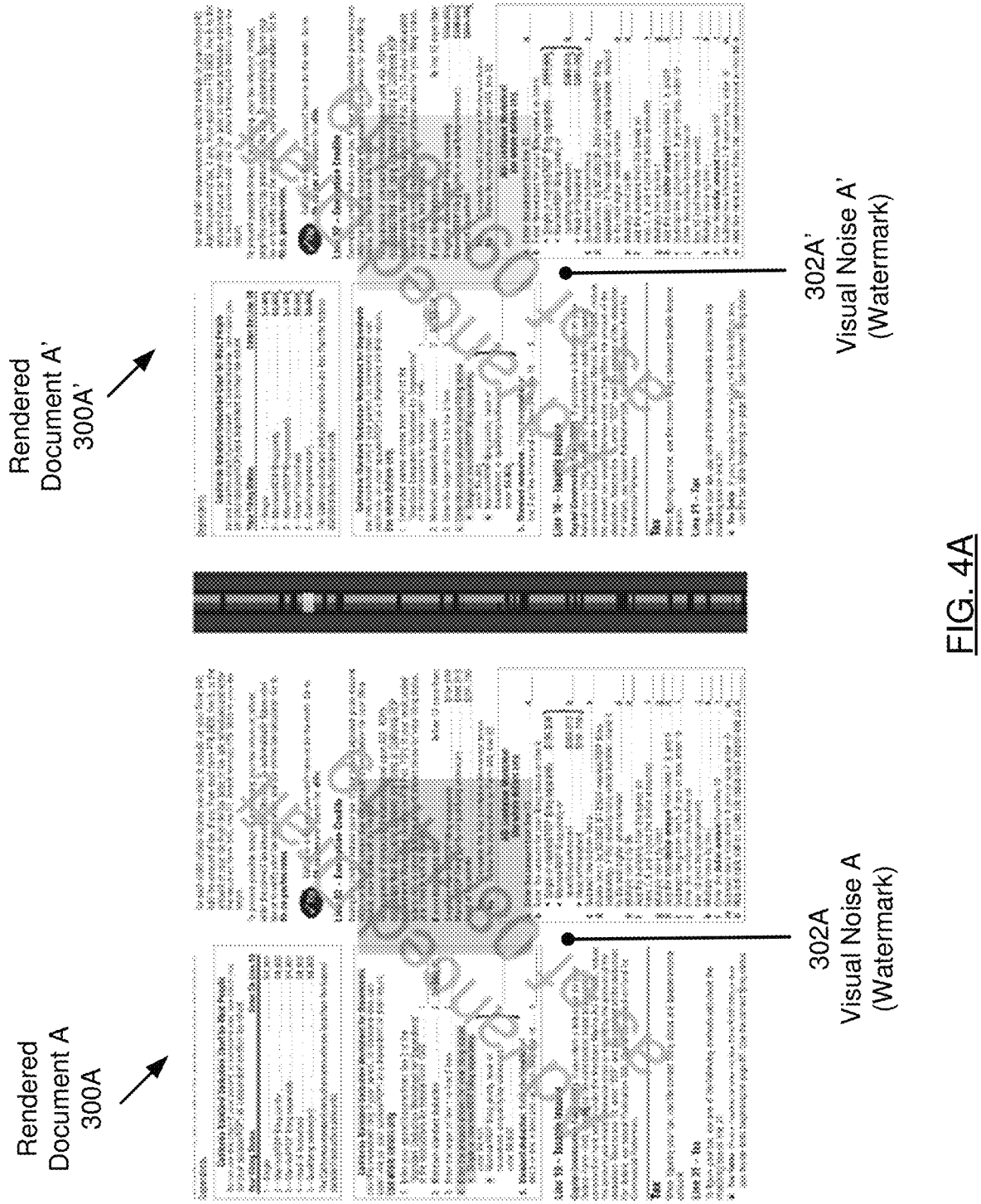
FIG. 4A, FIG. 4B, FIG. 4C, FIG. 4D, and FIG. 4E show examples in accordance with one or more embodiments of the invention.

The following examples are for explanatory purposes only and not intended to limit the scope of the invention. FIG. 4A, FIG. 4B, FIG. 4C, FIG. 4D, and FIG. 4E show implementation examples in accordance with one or more embodiments of the invention. FIG. 4A shows rendered document A (300A) ((104) in FIG. 1A) that includes visual noise A (302A) ((116V, 116X) in FIG. 1A) corresponding to a watermark indicating a date. FIG. 4A also shows rendered document A' (300A') that is a subsequent version of rendered document A (300A). Rendered document A' (300A') includes visual noise A' (302A') corresponding to a watermark indicating a later date. The watermarks are visual noise because when comparing the contents of the two versions, the watermarks are irrelevant.

Figure 4B:
Figure 4B:

Similarly, FIG. 4B shows rendered document B (300B) that includes visual noise B (302B) corresponding to an annotation (an arrow) indicating where new text is to be added in a subsequent version. FIG. 4B also shows rendered document B' (300B') that is a subsequent version of rendered document B (300B) including additional text at the location indicated by the annotation. The annotation is visual noise because when comparing the contents of the two versions, the annotation is irrelevant.

Figure 4C:
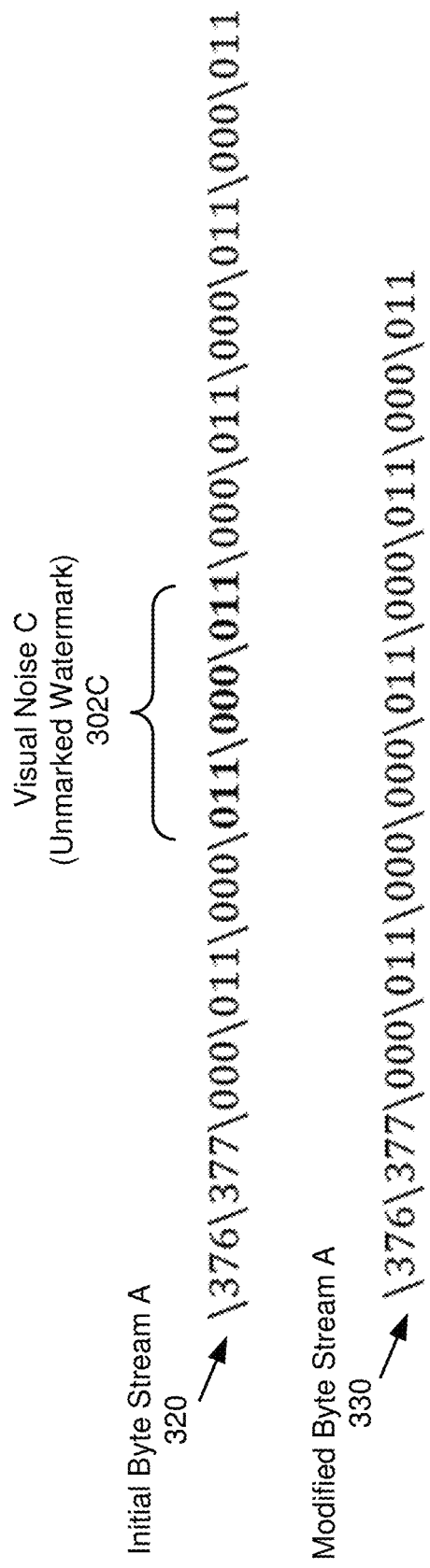

FIG. 4C shows an initial byte stream (320) ((106) in FIG. 1A) that includes visual noise C (302C) corresponding to an unmarked watermark (e.g., the object in the document code corresponding to the watermark is not explicitly marked as a watermark). Visual noise C (302C) is a byte sequence that matches a pattern of byte codes known to correspond to watermarks. FIG. 4C also shows a modified byte stream (330) resulting from the removal of the byte sequence corresponding to visual noise C (302C) from the initial byte stream (320).

Figure 4D:
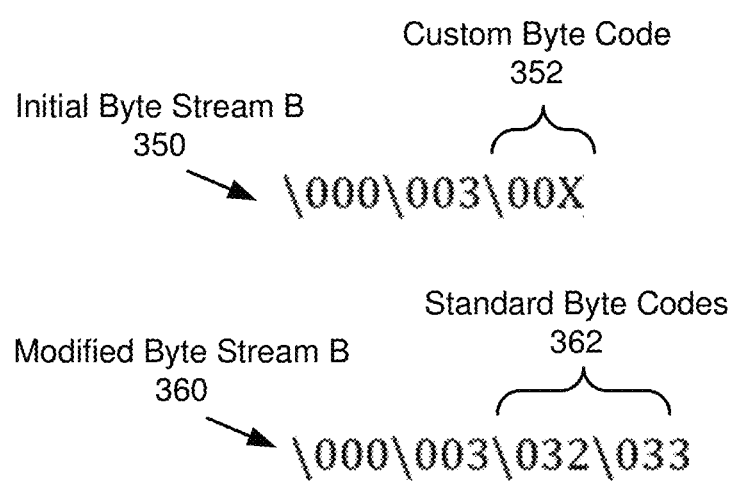

FIG. 4D shows an initial byte stream (350) that includes a custom byte code X (352) ((110C, 110G, 110J, 110M) in FIG. 1A and (110B, 110P) in FIG. 1B) that encodes a sequence of characters as defined in a custom character encoding set. FIG. 4D also shows a modified byte stream (360) resulting from replacing the custom byte code X (352) with equivalent standard byte codes (362) that encode the same sequence of characters encoded by the custom byte code X (352). The standard byte codes (362) are defined in a standard character encoding set. Thus, the modified byte stream (360) excludes nonvisual noise due to the presence of the custom byte code X (352) in the initial byte stream (350).

Figure 4E:
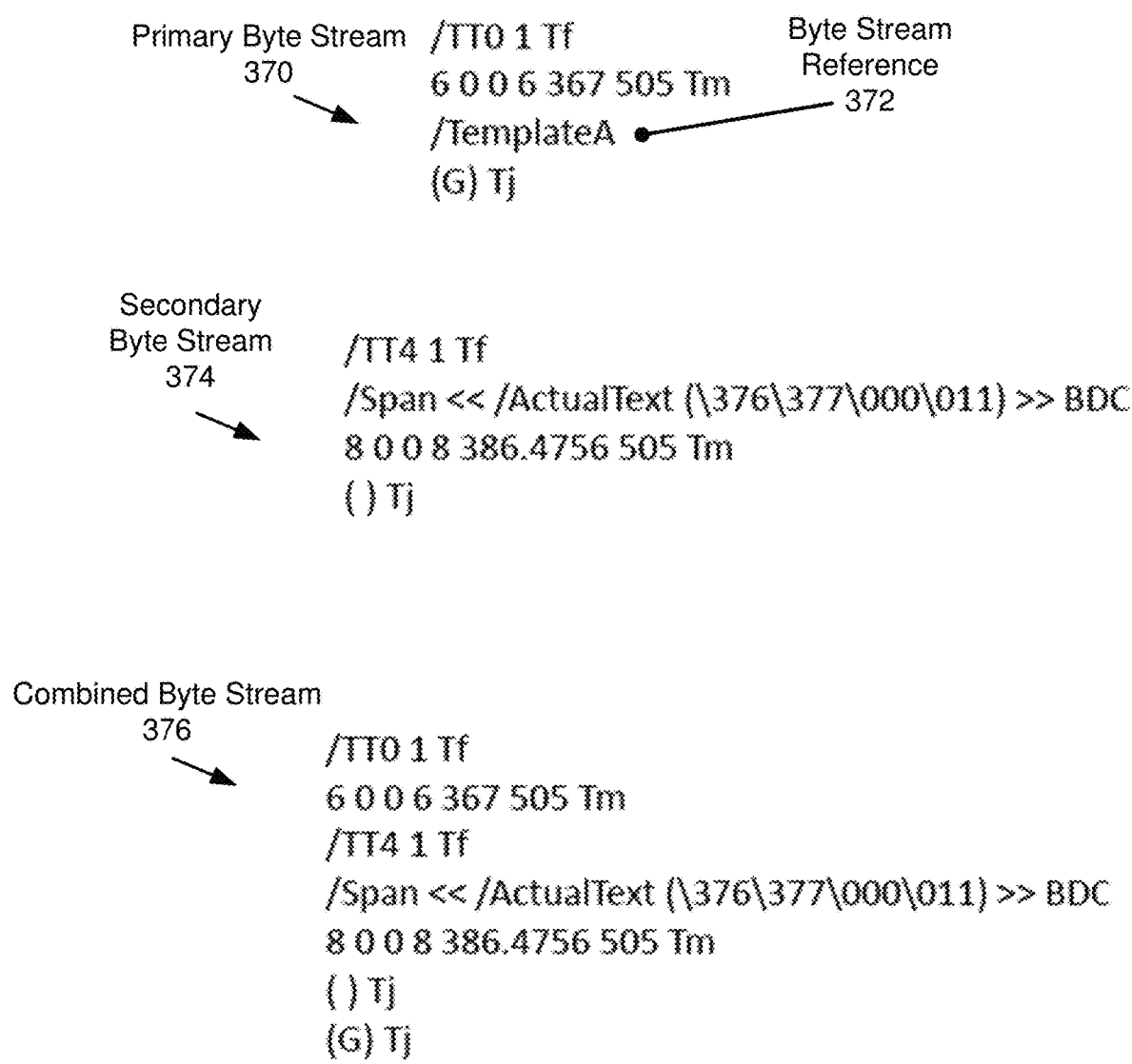

FIG. 4E shows a primary byte stream (370) that includes a byte stream reference (372) to a secondary byte stream (374). FIG. 4E also shows a single (e.g., flattened) combined byte stream (376) resulting from replacing the byte stream reference (372) in the primary byte stream (370) with the secondary byte stream (374). Thus, the combined byte stream (376) excludes nonvisual noise due to the multiple byte streams. That is, the combined byte stream (376) excludes nonvisual noise due to the byte stream reference (372) in the primary byte stream (370).

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same as or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5A:
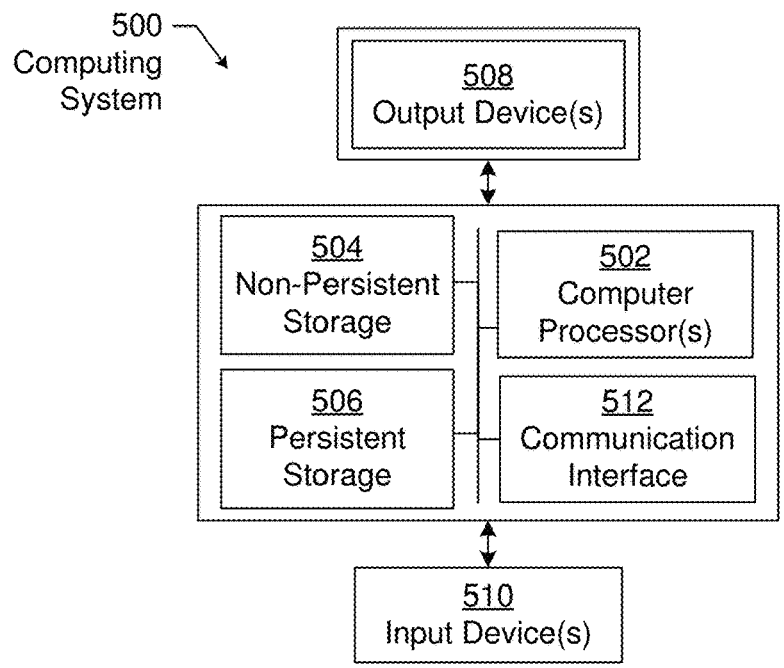
FIG. 5A and FIG. 5B show computing systems in accordance with one or more embodiments of the invention.
Figure 5B:
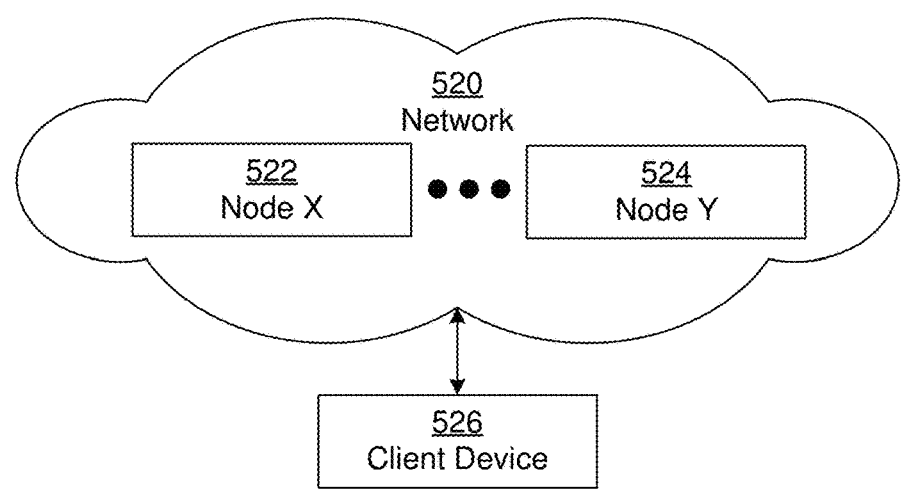

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   obtaining a first byte stream from first document code and a second byte stream from second document code, the first document code having a document type, and the second document code having the document type;
   identifying, in the first byte stream, first nonvisual noise corresponding to a first custom byte code defined in a custom character encoding set, wherein the first nonvisual noise is invisible when rendering the first document code;
   replacing, in the first byte stream, the first custom byte code with at least one standard byte code defined in a standard character encoding set to obtain modified document code, wherein the second document code uses the standard character encoding set; and
   comparing the modified document code with the second document code by comparing the first byte stream with the second byte stream.

2. The method of claim 1, wherein the first document code further comprises a third byte stream, the method further comprising:

combining the first byte stream and the third byte stream into a single byte stream.

3. The method of claim 2, wherein combining the first byte stream and the third byte stream comprises:
removing, from the first byte stream, a reference to the third byte stream; and
adding, to the first byte stream, the third byte stream.

4. The method of claim 1, further comprising:
validating the replacement of the first custom byte code with the at least one standard byte code, wherein the first custom byte code is replaced in response to validating the replacement of the first custom byte code;
identifying second nonvisual noise in the first byte stream corresponding to a second custom byte code defined in the custom character encoding set;
failing to validate replacement of the second custom byte code; and
in response to failing to validate the replacement of the second custom byte code, deciding not to replace the second custom byte code in the first byte stream.

5. The method of claim 4, wherein failing to validate the replacement of the second custom byte code comprises:
determining that the second custom byte code encodes a character defined in the custom character encoding set; and
determining that the character is undefined in the standard character encoding set.

6. The method of claim 1, wherein the first document code further comprises an object marked with a Boolean flag, the method further comprising:
identifying, in the first document code and based on the Boolean flag, visual noise corresponding to the object, wherein the visual noise is visible when rendering the first document code; and
in response to identifying the visual noise corresponding to the object, removing the object from the first document code.

7. The method of claim 6, wherein the object is removed from the first document code before replacing the first custom byte code with the at least one standard byte code.

8. The method of claim 1, wherein the first document code further comprises a first object comprising a first value of a property and a second object comprising a second value of the property, the method further comprising:
determining that the first object and the second object are within a threshold distance in the first byte stream;
in response to determining that the first object and the second object are within the threshold distance, determining that a ratio between the first value of the property and the second value of the property exceeds a threshold ratio;
in response to determining that the ratio between the first value of the property and the second value of the property exceeds the threshold ratio, identifying visual noise corresponding to the first object, wherein the visual noise is visible when rendering the first document code; and
in response to identifying the visual noise corresponding to the first object, removing the first object from the first document code.

9. The method of claim 1, wherein the first document code further comprises an object, and wherein the object corresponds to a portion of the first byte stream, the method further comprising:
identifying visual noise corresponding to the object by identifying a pattern of bytes in the portion of the first byte stream, wherein the visual noise is visible when rendering the first document code; and
in response to identifying the visual noise corresponding to the object, removing, from the first byte stream, the portion of the first byte stream.

10. A system, comprising:
a computer processor;
a repository configured to store:
first document code having a document type, the first document code comprising a first byte stream,
second document code having the document type, the second document code comprising a second byte stream,
a custom character encoding set, and
a standard character encoding set; and
a noise remover, executing on the computer processor and configured to:
identify, in the first byte stream, first nonvisual noise corresponding to a first custom byte code defined in the custom character encoding set, wherein the first nonvisual noise is invisible when rendering the first document code,
replace, in the first byte stream, the first custom byte code with at least one standard byte code defined in the standard character encoding set to obtain modified document code, wherein the second document code uses the standard character encoding set, and
compare the modified document code with the second document code by comparing the first byte stream with the second byte stream.

11. The system of claim 10, wherein the first document code further comprises a third byte stream, and wherein the noise remover is further configured to:
combine the first byte stream and the third byte stream into a single byte stream.

12. The system of claim 11, wherein the noise remover is further configured to combine the first byte stream and the third byte stream by:
removing, from the first byte stream, a reference to the third byte stream, and
adding, to the first byte stream, the third byte stream.

13. The system of claim 10, wherein the noise remover is further configured to:
validate the replacement of the first custom byte code with the at least one standard byte code, wherein the noise remover replaces the first custom byte code in response to validating the replacement of the first custom byte code,
identify second nonvisual noise in the first byte stream corresponding to a second custom byte code defined in the custom character encoding set,
fail to validate replacement of the second custom byte code, and
in response to failing to validate the replacement of the second custom byte code, decide not to replace the second custom byte code in the first byte stream.

14. The system of claim 13, wherein failing to validate the replacement of the second custom byte code comprises:
determining that the second custom byte code encodes a character defined in the custom character encoding set, and
determining that the character is undefined in the standard character encoding set.

15. The system of claim 10, wherein the first document further comprises an object marked with a Boolean flag, and wherein the noise remover is further configured to:

identify, in the first document code and based on the Boolean flag, visual noise corresponding to the object, wherein the visual noise is visible when rendering the first document code, and in response to identifying the visual noise corresponding to the object, remove the object from the first document code.

16. The system of claim 15, wherein the noise remover is further configured to remove the object from the first document code before replacing the first custom byte code with the at least one standard byte code.

17. The system of claim 10, wherein the first document code further comprises a first object comprising a first value of a property and a second object comprising a second value of the property, and wherein the noise remover is further configured to:

determine that the first object and the second object are within a threshold distance in the first byte stream, in response to determining that the first object and the second object are within the threshold distance, determine that a ratio between the first value of the property and the second value of the property exceeds a threshold ratio, in response to determining that the ratio between the first value of the property and the second value of the property exceeds the threshold ratio, identify visual noise corresponding to the first object, wherein the visual noise is visible when rendering the first document code, and in response to identifying the visual noise corresponding to the first object, remove the first object from the first document code.

18. The system of claim 10, wherein the first document further comprises an object, and wherein the noise remover is further configured to:

identify visual noise corresponding to the object by identifying a pattern of bytes in the portion of the first byte stream, wherein the visual noise is visible when rendering the first document code, and in response to identifying the visual noise corresponding to the object, remove, from the first byte stream, the portion of the first byte stream.

19. A non-transitory computer readable medium comprising instructions that, when executed by a computer processor, perform:

obtaining a first byte stream from first document code and a second byte stream from second document code, the first document code having a document type, and the second document code having the document type;

identifying, in the first byte stream, first nonvisual noise corresponding to a first custom byte code defined in a custom character encoding set, wherein the first nonvisual noise is invisible when rendering the first document code;

replacing, in the first byte stream, the first custom byte code with at least one standard byte code defined in a standard character encoding set to obtain modified document code, wherein the second document code uses the standard character encoding set; and comparing the modified document code with the second document code by comparing the first byte stream with the second byte stream.

20. The non-transitory computer readable medium of claim 19, wherein the instructions further perform:

combining the first byte stream and the third byte stream into a single byte stream.

* * * * *